US009116787B1

(12) United States Patent
Johnson

(10) Patent No.: US 9,116,787 B1
(45) Date of Patent: Aug. 25, 2015

(54) ELECTRONIC CONTROL SYSTEM FOR MOBILE HEAVY EQUIPMENT MACHINERY

(71) Applicant: Larry Fey Johnson, Punta Gorda, FL (US)

(72) Inventor: Larry Fey Johnson, Punta Gorda, FL (US)

(73) Assignee: Marden Industries, Inc., Punta Gorda, FL (US)

( * ) Notice: Subject to any disclaimer, the term of this patent is extended or adjusted under 35 U.S.C. 154(b) by 81 days.

(21) Appl. No.: 13/928,887

(22) Filed: Jun. 27, 2013

Related U.S. Application Data

(60) Provisional application No. 61/664,810, filed on Jun. 27, 2012.

(51) Int. Cl.
*G05D 1/00* (2006.01)
*G06F 17/00* (2006.01)

(52) U.S. Cl.
CPC ...................................... *G06F 17/00* (2013.01)

(58) Field of Classification Search
USPC ............................................................ 701/2
See application file for complete search history.

(56) References Cited

U.S. PATENT DOCUMENTS

| | | | | |
|---|---|---|---|---|
| 5,907,111 | A * | 5/1999 | Josten et al. ................. | 73/866.5 |
| 6,430,485 | B1 * | 8/2002 | Hullinger ..................... | 701/29.3 |
| 6,633,800 | B1 * | 10/2003 | Ward et al. ........................ | 701/2 |
| 7,478,817 | B1 * | 1/2009 | Carrier .......................... | 180/6.48 |
| 8,185,276 | B2 * | 5/2012 | Buckbee et al. ................ | 701/50 |
| 2002/0043242 | A1 * | 4/2002 | Ikeda et al. .................... | 123/396 |
| 2003/0167345 | A1 * | 9/2003 | Knight et al. ................. | 709/249 |
| 2004/0010349 | A1 * | 1/2004 | Perez et al. .................... | 700/287 |
| 2005/0004735 | A1 * | 1/2005 | Kelly et al. ...................... | 701/50 |
| 2006/0047377 | A1 * | 3/2006 | Ferguson et al. ................. | 701/2 |
| 2006/0079278 | A1 * | 4/2006 | Ferguson et al. ............. | 455/557 |
| 2007/0142990 | A1 * | 6/2007 | Moughler et al. .............. | 701/50 |
| 2008/0109122 | A1 * | 5/2008 | Ferguson et al. ................. | 701/2 |
| 2008/0208395 | A1 * | 8/2008 | Self et al. .......................... | 701/2 |
| 2009/0318263 | A1 * | 12/2009 | Yu et al. ....................... | 477/92 |
| 2010/0256837 | A1 * | 10/2010 | Schmidt ........................... | 701/2 |
| 2012/0330597 | A1 * | 12/2012 | Lammers ..................... | 702/122 |

OTHER PUBLICATIONS

Bosch Electronic Remote Control for mobile application, RE 29896 04.09 Apr. 2009.*

* cited by examiner

*Primary Examiner* — Calvin Cheung
(74) *Attorney, Agent, or Firm* — William E. Noonan

(57) ABSTRACT

A control system for mobile heavy equipment machinery includes an electronic control module for receiving and processing pulse width modulated control signals. There is a programmable logic controller (PLC) that receives position sensor generated input signals selectively from manual and remote sources. The PLC processes the input signals and transmits such signals in pulse width modulated format to the electronic control module, which processes the signals and directs corresponding output signals to control operation of the equipment.

18 Claims, 1 Drawing Sheet

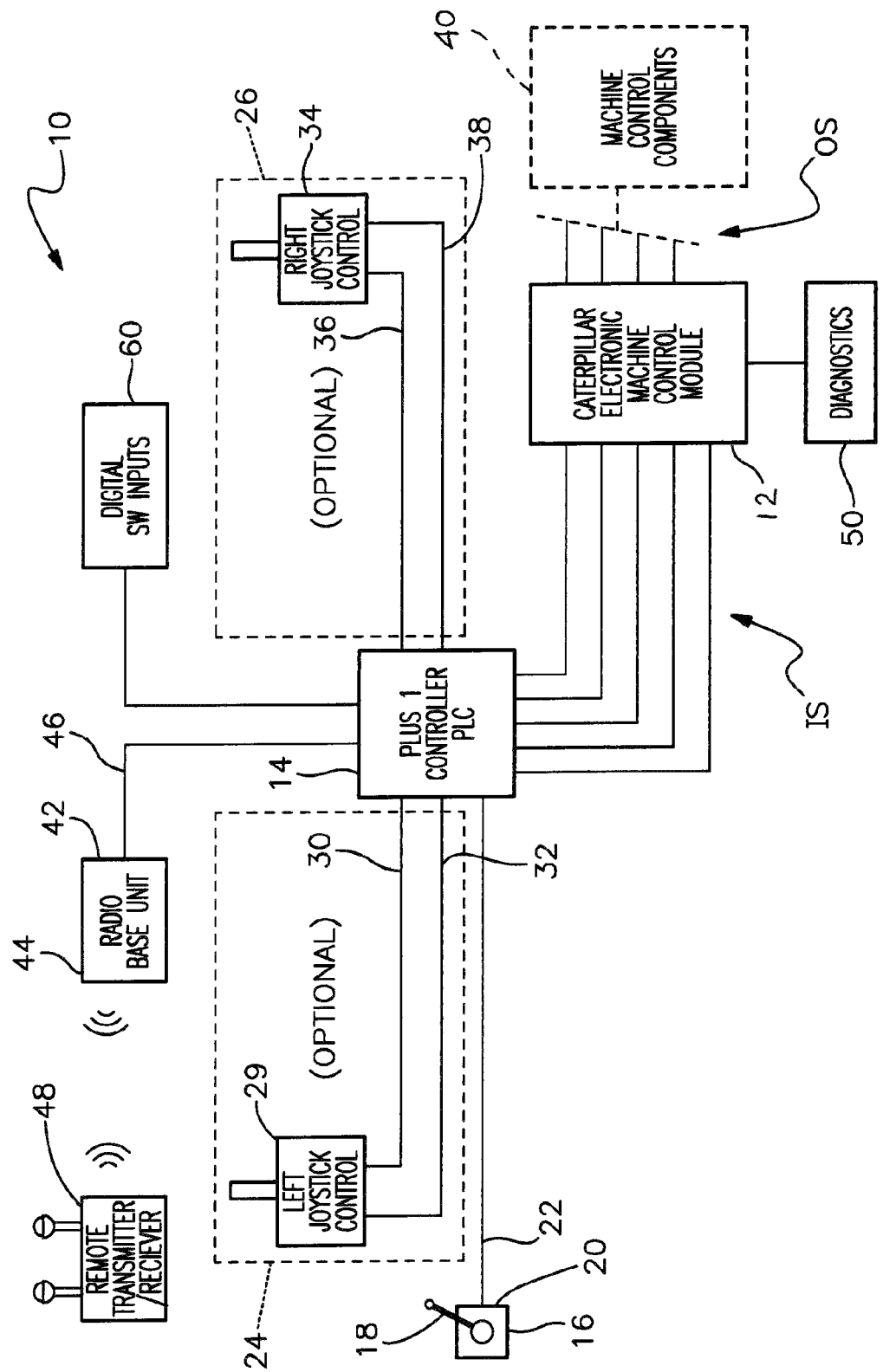

ELECTRONIC CONTROL SYSTEM FOR MOBILE HEAVY EQUIPMENT MACHINERY

RELATED APPLICATION

This application claims the benefit of U.S. Provisional Patent Application Ser. No. 61/664,810, filed Jun. 27, 2012.

FIELD OF THE INVENTION

This invention relates to an electronic control system for mobile heavy equipment machines and, more particularly, to a programmable logic control module that is operably integrated with the existing electronic control module (ECM) of the machine and which enables the ECM to successfully control operation of the machine in response to either manually or remotely generated input signals without the need for either an independent second control system or complicated switching equipment.

BACKGROUND OF THE INVENTION

Tractors and other types of mobile heavy equipment (e.g. earth moving, construction, forestry and agricultural machines) are conventionally controlled by an electronic control module (ECM). This device typically comprises a microprocessor that responds to sensed input signals and generates corresponding output signals that control operation of the machinery and its components (e.g. throttle, steering, boom, bucket, mulcher, shredder, or other working head, etc.) in accordance with the sensed input signal. The ECM has also been used in some machines, such as those manufactured by Caterpillar Corporation, as a diagnostic tool to monitor various component systems (e.g. engine, cooling, brakes) of the heavy equipment.

Most types of mobile heavy equipment have traditionally been manned by a human operator who sits on the equipment and sends selected control signals to the ECM via manual controls such as a joystick, lever, etc. In other applications, for example on steep, precipitous or unstable terrain or for the removal of explosives from a battle zone or mined area, it may be extremely dangerous and unacceptable for an operator to personally ride on the equipment. This is particularly so when the machine involved is small and/or compact and does not provide the operator with sufficient protection from an equipment rollover, explosion or other potentially catastrophic event.

Remote control systems have been developed for operating heavy equipment in potentially dangerous applications of the type described above. However, such systems tend to be unduly expensive, complicated and inefficient. This is particularly so when the equipment is already provided with an existing ECM that enables an operator to manually control the machine. In some cases, a separate and/or retrofit receiver/control unit must be programmed independently of the ECM to send output signals to its own dedicated control components (e.g. valves, switches, solenoids). Such remote control systems are expensive and complicated to program, install and maintain. Alternatively, control of the machine can be transferred, as needed, between manual and remote control units through the use of gang relays and other switching systems which are again fairly complex and costly.

The foregoing difficulties can be especially problematic in machines employing an ECM that utilizes pulse width modulated (PWM) control signals. The previously described electronic control module conventionally employed by the machines produced by Caterpillar Corp. is a representative example of a controller that features pulse width modulation. Such ECMs are incompatible with the 1939 CAN communications signal protocol utilized by many standard remote control systems as well as in most conventional heavy equipment control systems. The PWM compatible ECM cannot process CAN Input signals and this cannot be controlled remotely. In the case of the Caterpillar ECM, the extremely useful diagnostic function performed by that controller would be disabled and unavailable during remote control operation. To date, no known control system has been provided for modifying and adapting a pulse width modulation compatible ECM of the type described above so that it is operably responsive to both manually and remotely generated PMW input signals, as well as switched digital inputs. The present invention provides a control system that accomplishes this purpose and overcomes the shortcomings of the prior art.

SUMMARY OF THE INVENTION

It is therefore an object of the present invention to provide an electronic control system that allows a wide variety of mobile equipment machines to be operated and controlled reliably and efficiently using either remote or manually generated control signals.

It is a further object of this invention to provide an electronic control system that processes either manually or remotely generated control signals without requiring respective independent controllers, complicated programming and extraneous, independently operated control components such as switches, valves and solenoids.

It is a further object of this invention to provide a heavy equipment control system employing a programmable logic controller that is integrated with the equipment's existing ECM and that permits the ECM to be successfully controlled by either manually or remotely generated signals without requiring the installation and use of complex, costly and inefficient gang relays and/or switching systems.

It is a further object of this invention to provide a control system for mobile heavy equipment machinery that enables the Caterpillar ECM and other existing heavy equipment ECMs that employ pulse width modulation communication protocol to be operated by either manually generated PWM signals or remotely generated signals using a standard 1939 CAN protocol.

It is a further object of this invention to provide a control system for mobile heavy equipment machinery that allows the standard Caterpillar ECM to be used effectively and efficiency so that its diagnostic features are fully available regardless of whether the controller input signals are generated manually or remotely.

It is a further object of this invention to provide a control system for mobile heavy equipment machinery that allows such equipment to be used successfully for a wide variety of applications including explosives removal and in other dangerous environments where remote operation of the machinery is preferred or required.

This invention results from a realization that a pulse width modulation (PWM) compatible electronic control module for a piece of heavy equipment machinery may be adapted to respond reliably and effectively to both manually and remotely generated signals by integrating that control module with a programmable logic controller that transmits input signals to the control module selectively from either manual controls or a remote controlled base unit. The PLC is programmed to convert the signal protocol from the remote control base unit to a PWM protocol that is compatible with the electronic control module. This allows the electronic control module and all of its functions to be available regardless of whether input signals are generated manually or remotely.

This invention features an electronic control system for mobile heavy equipment machinery. The system includes an electronic control module (ECM) for receiving pulse width modulated (PWM) input signals and generating corresponding pulse width modulated output signals, which are directed to operating components (e.g. switches, valves, solenoids) of the machine. There is at least one manually engageable sensor for generating a pulse width modulation manual input signal. A remote control system includes a control signal transmitter and a base unit responsive to the remote control signals for generating remote input signals. A programmable logic controller (PLC) receives the manual and remote control input signals. The PLC is programmed to convert the remote input signals into pulse width modulated form. The PLC transmits a selected one of the pulse width modulated manual input signals and the pulse with modulated remote input signals to the electronic control module. The electronic control module responds by generating a corresponding pulse with modulated output signal to control operation of the machine.

In a preferred embodiment, the remote control input signals may feature a 1939 CAN protocol. The sensor may include a throttle position sensor for producing an input signal indicative of a selected throttle position and engine speed. The throttle position sensor may be responsive to manual operation of a control lever. The sensor may also include manually activated means for generating input signals indicative of forward and reverse motion of the machine. Such manually activated means may include one or more joystick controllers. The joystick may also be operated to provide a signal corresponding to movement of the machine in a selected direction. One or more joysticks or other sensors may selectively provide control signals to operate one or more components of the machine in a predetermined manner. These components may include items such as the travel direction, boom, bucket, and working head (e.g. shredder, mulcher, etc.). The PLC may be programmed to convert the remote control input signals into pulse width modulated signals for use by the ECM in controlling the functions and operations of the machine.

BRIEF DESCRIPTION OF THE DRAWINGS

Other objects, features and advantages will occur from the following description of a preferred embodiment and the accompanying drawing, in which:

FIG. 1 is a schematic view of the control system of this invention;

There is shown in FIG. 1 an electronic control system 10 for use in controlling the operation of a mobile heavy equipment machine. This may include a wide variety of mobile machinery, including, but not limited to tractors and heavy equipment machinery used for earth moving, construction, forestry and agricultural applications, as well as other industrial purposes. The particular type or brand of the machinery involved is not a limitation of this invention, although it has been determined that the electronic control system is particularly effective for use in machines that feature a pulse width modulated compatible electronic control module, as provided by Caterpillar Corporation. Such equipment may include not only Caterpillar machines themselves, but also heavy equipment machines wherein one or more of the components, e.g. the engine, cooling system, hydraulic system, etc. have been modified from those used by the standard Caterpillar equipment.

System 10 features standard electronic control module (ECM) 12, which may comprise the Caterpillar™ electronic machine control module or an alternative electronic control module that receives and generates pulse width modulated signals for controlling the operation of a piece of heavy machinery (not shown). The electronic control module may utilize various known types of microprocessors that are programmed in a manner that is known to persons skilled in the art. In particular, manually generated control signals, which are produced by an operator seated in the machine, are delivered to ECM 12, which then generates pulse width modulated output signals to control the various machine control components (e.g. valves, switches, solenoids) associated with operational systems (engine, braking, steering, hydraulics) of the machine. The control system of the present invention utilizes an ECM 12 that functions in a manner analogous to previously available electronic control modules in the heavy equipment industry.

A programmable logic controller (PLC) 14 is integrated with ECM 12 to enable the machinery to be controlled either manually or remotely. PLC 14 may comprise various known types of programmable logic controllers such as the PLUS 1™ controller. That controller is programmed using programming techniques that will be known to persons skilled in the art in order for the control system 10 to function in the manner described more fully below.

Means are utilized for providing both manual and remote input signals to PLC 14. In particular, a throttle position sensor 16 comprising a manually operated lever 18 and an electronic sensor 20 is mounted on the machine for convenient access by the human operator who is seated or standing on the machine. Wiring 22 electrically interconnects sensor 20 to an input of PLC 14. Position sensor 16 is actuated by the operator to provide PWM input signals over wiring 22 to PLC 14. These signals have a frequency of 500 Hz and a duty cycle operating range between 10-90%. The throttle position sensor features an input voltage of 8 volts DC. At a neutral position of lever 18, the signal from sensor 20 is typically 10% duty cycle. Depending on the programming of the software of PLC 14, the duty cycle will proportionally increase to 90%, which the software interprets as a maximum signal. Alternatively, actuation of the lever in an opposite direction will proportionally decrease the duty cycle to 10%, which represents a minimum signal.

Optional joystick position sensor controls 24 and 26 may also be hardwired to respective inputs of PLC 14. Left joystick control 24 includes a position sensor 28 that is operated to provide PWM signals over wiring 30 and 32 to PLC 14, which respectively control forward/reverse travel and left/right travel. Analogously, right joystick control 26 features a standard position sensor 34 for generating PWM signals over wiring 36 and 38 for respectively controlling boom up/down and bucket curl/dump operations. In each case, the joystick position sensor 28, 34 is actuated by the operator manually situated on the machine. The joystick position sensors feature a 12-volt DC input and an adjustable duty cycle of 10%-90%. The neutral position of each joystick is typically 50% duty cycle +/− a certain percent of dead band (e.g. 45-55% of duty cycle). It should be understood that the joystick position sensors may be modified from the construction described above in order to produce control systems for operating various other functions and operations of standard heavy equipment machinery as required. For example, when the machinery includes mulching or shredding heads, one or more of the joysticks may be employed to operate those heads to perform predetermined functions. The specifications of the manually operated position sensors may be varied within the scope of this invention.

PLC 14 is programmed to transmit the manually generated input signals IS in pulse width modulated form from respective outputs of PLC 14 to inputs of ECM 12. The electronic control module 12 then processes these signals in a standard manner to produce standard output signals OS, which are directed to and operate the standard machine control components 40 of the machine. As previously described, these may include various switches, valves and solenoids associated with components of the machinery such as the engine, steering, cooling, hydraulics.

System 10 also includes a remotely controlled input signal generator 42 comprising a radio base unit 44. The radio base unit is connected by wiring 46 to an input of PLC 14. Base unit 44 receives control signals transmitted by operation of remote transmitter/receiver (transceiver) 48. Transceiver 48 communicates with radio base unit 44 and specifically directs control signals to the radio base unit that correspond to the manually generated input signals previously described. These can include signals relating to operation of the throttle, forward/reverse travel, steering, boom/bucket/head operation, etc., and various switched digital inputs. Unit 42 responds by generating standard 1939 CAN signals, which are communications signals using the standard protocol conventionally used by most heavy equipment machinery. These signals are transmitted over wiring 46 to an input of controller 14. The controller includes software that is programmed using techniques that will be known to persons skilled in the art such that the input CAN signals are converted to corresponding pulse width modulated signals IS, which are, in turn, transmitted from the output of PLC 14 to an input of ECM 12. Once again, the electronic control module 12 processes these input signals IS to produce PWM output signals OS for operating machine control components 40. Independent control components and/or complex gang relays are not needed.

System 10 uniquely allows the heavy equipment machinery to be controlled and operated using either manually generated or remotely transmitted control signals utilizing the standard machine ECM(s) and software. This enables the machine to be controlled by an operator situated on the machine in applications where it is important for a person to be so situated for visually inspecting the job and/or making immediate, up-close decisions. Alternatively, remote control operation may be selected for removing mines/IED's or other explosives or for working on hazardous terrain where an unacceptable risk of equipment roll-over and resulting personal injury would accompany the presence of a human operator on the machine.

In operation, either manual or remote operation is selected. PLC 14 is programmed such that if remote operation is selected, (e.g., by activating radio base unit 42) manual operation using throttle position sensor 16 and joystick controls 24 and 26 is disabled. This prevents the possibility that contradictory and potentially dangerous signals will be generated. The control system is manually operated by actuating lever 18 and optional joysticks 28 and 34. The respective position sensors 20, 28 and 34 generate PWM signals that are transmitted in unmodified form by PLC 14 to ECM 12. As previously described, the electronic control module processes these signals and produces output signals OS for controlling operation of the machine. Alternatively, input control signals can be generated by remote operation of transceiver 48. Unit 42 transmits CAN signals over wire 46 to PLC 14. Software in the PLC converts these CAN signals to PWM signals IS, which are again processed by the conventional ECM 12 to produce output signals OS for controlling components 40.

System 10, and in particular the integration of PLC 14 with ECM 12 enables the heavy equipment machine to be controlled either manually or remotely in a much more convenient and efficient manner than has been heretofore possible. The remote control base unit 44 does not have to be provided with and connected to its own dedicated set of valves, switches and solenoids. Rather, a single set of machine controlled components 40 may be utilized for both manual and remove signal operation. By the same token, expensive and complicated gang relays or alternative switching means are not needed for connecting the radio base unit to the pre-existing control components. This eliminates the need for two independent control systems as well as the expense that will be associated with constructing and programming two such systems.

System 10, and more particularly the integration of PLC 14 with ECM 12, for the first time enables ECM 12 to process both manually generated PWM signals and remotely generated CAN protocol signals. This is accomplished through the conversion of the CAN remote control input signals to PWM signals by PLC 14. ECM 12 therefore receives input signals IS either manually from a manual operator situated on the machine or from a remote signal transmitter. In either case, the generated signals are transmitted by PLC to module 12 in ECM compatible, pulse with modulated format. Significantly, this allows continued, effective use of the diagnostic module 50 associated with the Caterpillar electronic control module in conjunction with both manual and remote operation. This is a significant benefit which the prior art does not provide.

As further shown in FIG. 1, standard switch inputs 60 may also be input into PLC 14. These inputs may be transmitted by PLC 14 to ECM 12 and from there to various components of the machine such as ignition/starting, parking brake, seat, armrest, speed control, etc. which operate conventionally using switch based digital control signals. In any event, the benefits of this invention are achieved primarily from the processing of the position sensor generated signals provided by the manual and remote control signal generating units described above.

Accordingly, the present invention provides for an electronic control system for reliably and efficiently controlling the operation of mobile heavy equipment machinery. The system allows the use of a conventional PWM compatible ECM to process both manually and remotely generated control signals. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. An electronic control system for providing selected manual and remote control of mobile heavy equipment machinery, which machinery includes a plurality of operating components that effect respective operations of the machinery, said system comprising:

at least one sensor for being mounted to the machinery and for being manually engageable by a human operator positioned on the machinery to generate manual pulse width modulated input signals;

a remote control signal system including a remote control signal transmitter for being located remotely of the machinery and a receiver, said receiver for being mounted to the machinery and responsive to remote control signals from said transmitter for generating corresponding remote CAN protocol input signals;

a single programmable logic controller programmed to receive a selected one of said manual pulse width modulated input signals and said remote CAN protocol input signals and convert any said remote CAN protocol input signals, which are selected, into remote pulse with modulated input signals, said programmable logic controller being further programmed to selectively direct said manual and remote pulse width modulated input signals selectively to a single electronic control module, said electronic control module generating corresponding pulse width modulated output signals that are directed to and control selected manual and remote operation of the operating components of the machinery through a single set of machine control components and without requiring the use of two independent sets of machine control components to respectively control manual and remote operation of the machinery.

2. The system of claim 1 in which said remote control input signals utilize a 1939 CAN protocol.

3. The system of claim 1 wherein at least one manually engageable sensor includes a manually engageable throttle position sensor for producing a pulse width modulated manual input signal indicative of a selected throttle position and corresponding engine speed of the machinery.

4. The system of claim 3 in which said throttle position sensor is responsive to manual operation of a control lever.

5. The system of claim 1 in which said at least one manually engageable sensor includes manually activated means for generating input signals indicative of forward and reverse motion of the machinery.

6. The system of claim 5 in which said manually activated means include at least one joystick controller.

7. The system of claim 6 in which at least one said joystick controller is operable to direct the machinery in a selected direction of travel.

8. The system of claim 1 in which at least one said joystick controller is provided for directing operation of the operating components of the machinery.

9. The system of claim 1 in which said programmable logic controller is programmed to convert said remote control input signals into pulse width modulated signals, which are directed to said electronic control module.

10. The system of claim 1 in which said remote control system is selectively activatable and said programmable logic controller is programmed to disable each said manually engageable sensor and prevent generation of said manual input signals in response to selected activation of said remote control system.

11. The system of claim 10 in which said receiver includes a radio base unit, which is selectively activated to activate said remote control system.

12. The system of claim 1 in which said receiver is selectively connected to said operating control components directly through said programmable logic computer and the electronic control module without the use of a gang relay or other form of switching means to interconnect said receiver and said operating control components.

13. An electronic control system for mobile heavy equipment machinery, which machinery has operating components that effect operation of the machinery and an electronic control module for receiving pulse width modulated input signals and generating corresponding pulse width modulated output signals, which are directed to and operatively control the operating components of the machinery, said system comprising:

at least one manually engageable sensor for being mounted to the machinery and generating manual pulse width modulated input signals;

a remote control system including a remote control signal transmitter located remotely of the machinery and a receiver, said receiver for being mounted on the machinery and responsive to remote control signals from said transmitter for generating corresponding remote CAN protocol input signals; and a single programmable logic controller for receiving a selected one of either said manual pulse width modulated input signals or said remote CAN protocol input signals, converting said remote CAN protocol input signals into pulse width modulated input signals and directing said manual and remote pulse width modulated input signals selectively to the electronic control module.

14. The system of claim 13 in which said remote control system is selectively activatable and said programmable logic controller is programmed to disable each said manually engageable sensor and prevent generation of said manual input signals in response to selected activation of said remote control system.

15. The system of claim 14 in which said receiver includes a radio base unit, which is selectively activated to activate said remote control system.

16. A mobile heavy equipment machine with an electronic control system for providing selected manual and remote control of the machine but, said machine being adapted for selectively accommodating a human operator to initiate manual control of the machine, said machine comprising:

a mobile heavy equipment machine including a plurality of operating components that effect respective operations of the machine;

at least one sensor mounted to the machine and being manually engageable by the human operator accommodated on the machine to generate manual pulse width modulated input signals;

a remote control system including a remote control signal transmitter located remotely of the machine and a receiver mounted to the machine and responsive to remote control signals from said transmitter for generating corresponding remote CAN protocol input signals;

a single programmable logic controller programmed to receive a selected one of said manual pulse width modulated input signals and said remote CAN protocol input signals and convert any said remote CAN protocol input signals, which are selected, into remote pulse width modulated input signals, said programmable logic controller being further programmed to selectively direct said manual and remote pulse width modulated input signals to a single electronic control module, said electronic control module generating corresponding pulse width modulated output signals that are directed to and control selected manual and remote operation of the operating components of said machine through a single set of machine control components and without requiring the use of two independent sets of machine control components to respectively control manual and remote operation of said machine and further without further requiring the use of switching means for interconnecting said receiver to said machine control components.

17. The system of claim 16 in which said remote control is selectively activatable and said programmable logic controller is programmed to disable each said manually engageable sensor and prevent generation of said manual input signals in response to selected activation of said remote control system.

18. The system of claim 17 in which said receiver includes a radio base unit, which is selectively activated to activate said remote control system.

\* \* \* \* \*